ically shaped aper-# UNITED STATES PATENT OFFICE.

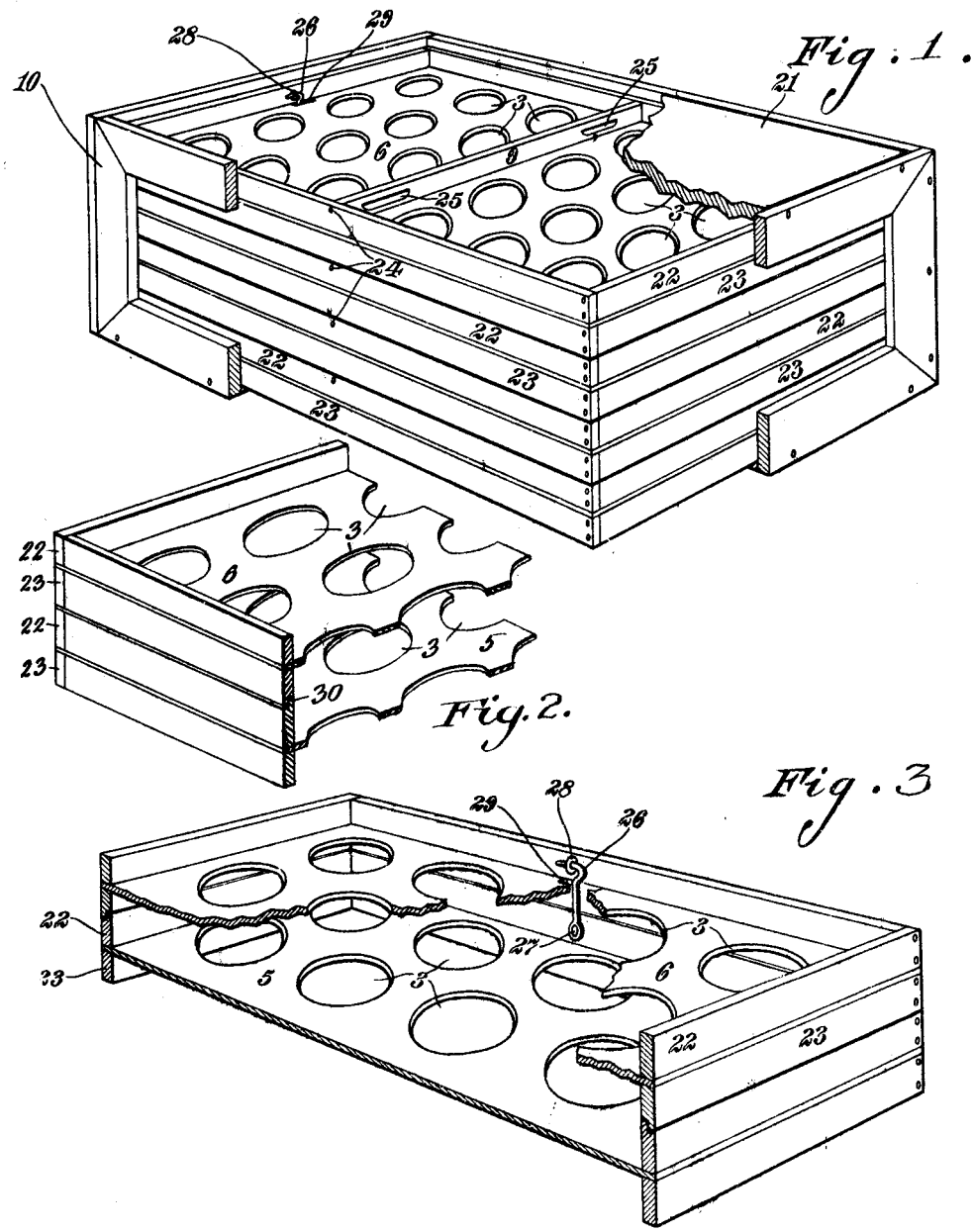

BERTHOLD A. LANGE, OF ST. LOUIS, MISSOURI.

CRATE.

1,179,845.   Specification of Letters Patent.   Patented Apr. 18, 1916.

Application filed March 26, 1914.   Serial No. 827,432.

*To all whom it may concern:*

Be it known that I, BERTHOLD A. LANGE, a citizen of the United States, residing at the city of St. Louis, State of Missouri, have invented certain new and useful Improvements in Crates, of which the following is a specification.

This invention relates to improvements in crates. Its object is to provide a convenient and cheap means of comparatively light weight for packing eggs, electric film bulbs, lamp globes, and other fragile articles for shipment, storage, or handling in large or small numbers or individually with a minimum risk of breakage, each fragile article being resiliently supported separately away from contact one with the other and from contact with the box-sides and the like in a layer in appropriately shaped apertures located in a tray, the apertures being suitably spaced from each other for supporting the fragile article free from contact with parts of said tray except at the two parts of said fragile article received in said apertures, said tray being removably inserted in a crate, box, or container and supported as hereinafter described.

A further object of this invention is to provide means for packing a series of these trays containing fragile articles in superimposed tiers or layers removably stacked one upon the other within a crate, box, or container, each layer or tier being separately removable from the top downward, and each layer, as removed, constituting a group or nest capable of being handled without disturbing the individually-packed fragile articles forming said group or nest.

A purpose accomplished and an advantage secured by providing a means for handling fragile articles in groups or nests in removable layers is that, for instance, in the case of eggs packed for storage in a large crate containing a plurality of layers by means of this invention, the superimposed layers of the large crate may be removed one by one beginning with the top layer and the eggs candled in groups of the number composing each group, or the eggs may be repacked in smaller crates of a size sufficient to accommodate one layer or any number of layers less than that contained in the original large crate. Thus, for instance, a crate containing twelve dozen eggs packed in layers composed of groups or nests of a dozen eggs in each group or nest by means of this invention, may readily be divided into twelve separate packages by removing each of the layers comprising the group or nest of twelve eggs contained in each tray, and, placing each tray in a separate box, crate, or container of suitable size, the twelve separate packages may be shipped to twelve different customers. Similarly any easily frangible articles may be repacked from larger into smaller crates for distribution or for any other desirable purpose or purposes by means of this invention.

The trays of this invention holding groups or nests of any convenient number of fragile articles may be composed of any suitable material, such, for instance, as cardboard, and the apertures therein may be made by stamping, cutting, or otherwise.

In the accompanying drawings, forming part of this specification, in which like numbers of reference denote like parts wherever they occur, Figure 1 is a perspective view, showing a plurality of trays within a crate, part of the latter being broken away; Fig. 2 is a fragmentary perspective view, partly in section, showing a means, in a form of tray of this invention, for removably fitting superimposed parts intimately together; Fig. 3 is a fragmentary perspective view, partly in section, of one of the trays depicted in Fig. 1, showing a means for locking together the platforms of the same.

Fig. 1 illustrates a form of crate and tray particularly well adapted for packing fragile articles for storage, as, for example, for packing eggs for storage in cold storage plants. The container 10 is a box, crate, or case of a frame made of wood or other suitable material, the side panels of said container being omitted in construction and having a closed bottom (not shown) and a removable lid or cover 21 (shown in fragmentary section) fitting into the frame of the container and closing the top thereof when the container is filled with the trays of this invention. The two platforms 5 and 6 (Figs. 1 and 2) composing the form of tray shown in Fig. 1 is made of cardboard or some other suitable material of light weight with apertures 3 (hereinbefore described) each of said platforms being attached, in the preferable construction of this form of tray, to a frame surrounding said platform, by catching and holding the outer edges of said platform between the two similarly constructed halves 22 and 23 of said frame which is made of wood or other suitable material, the frame parts 22 and 23 being united by any suitable means with the edges of the platform between them, and forming flanges of suitable depth around the outer edges of each platform to provide a means for supporting each platform in a spaced relation to its companion platform composing a tray so as to permit of packing fragile articles between said platforms as hereinbefore described, and, further, said frame halves 22 and 23 providing a means for spacing an underlying tray platform from the adjacent platform of a superimposed tray sufficiently apart to prevent the contents of either tray from coming in contact with the contents of the other, and, also, providing a means for spacing the lower platform of a tray adjacent to the bottom of the container sufficiently away from said bottom to prevent the contents of said tray from coming in contact with said bottom, and providing a means for spacing the upper platform of a tray adjacent to the cover 21 of the container 10 sufficiently away from said cover to prevent the contents of said tray from coming in contact with said cover. The reinforcing member 9 provides a means for handling its attached platform, or a filled or empty tray of this form for any purpose or purposes whatsoever. The reinforcing member 9 in this form of tray is preferably a strip of wood running transversely across the upper face of a rectangular platform of a tray at a right angle with either side of said platform being attached to the side frames of the platform at the ends of said reinforcing strip by any suitable means such, for instance, as a nail 24, said reinforcing member 9 having grooves 25 providing a convenient means for grasping said member with one or both hands. The number, location, and construction of the reinforcing members, such as 9, attached to a platform may be varied, and, also, for the grooves 25 any other suitable grasping means.

To provide means for locking together the platforms of a tray of the form depicted in Fig. 1, a hook 26 swinging pivotally from a shank of suitable length about an attaching means 27 upon the frame of one platform of a tray may be inserted into an eyelet screwed into the frame of the other platform of that tray, the shank of the hook 26 extending from one platform to the other of said tray through a suitable slot 29 of a size adapted to permit said hook to swing on its pivotal attachment 27 sufficiently for inserting and withdrawing said hook from the eyelet 28 for the purpose of connecting and disconnecting the two platforms of the tray. Two or more locking devices such as that described may be attached to opposite inside parts of the frames of two platforms forming a tray for a means for conveniently locking the two platforms of a tray together to permit of handling a tray, filled or unfilled, as a connected unit. Any other suitable locking means for locking two platforms of a tray together, or any other combination of parts suitable for that purpose, may be substituted for the locking means and the combination of parts therefor described herein.

By means of rabbeting 30 (Fig. 2) the adjacent edges of the frames 22 and 23 of the two platforms forming a tray an intimate association of parts is attained as illustrated in Fig. 2. In this form of tray (Fig. 2) the two platforms forming a tray are held in stable relation to each other, said rabbeting 30 of the adjacent edges of the platform frames tending to prevent either platform of a tray from sliding away laterally from its companion platform and thus attains the advantage of an intimate union of parts in a filled or empty tray and provides a means for security to the contents of a tray so constructed. The rabbeting 30 is of especial advantage in trays of this invention used for storing fragile articles packed therein without using a container 10 (Fig. 1) for said trays. Any suitable form of rabbeting may be substituted for that shown in Fig. 2.

When one or more trays of the forms depicted in Figs. 1 and 2 are packed in an open paneled container 10 (Fig. 1) said open panels are closed (filled in) by means of the platform frame parts 22 and 23, which platform frame parts then form the panels of the container frame and the contents of the tray or trays packed in said container is closed in on all sides and boxed in a strong package of comparatively light weight with the further advantage that a saving of material has been achieved in the construction of an open paneled skeleton container rather than making a container of completed box construction.

Various changes in details of construction and arrangement of parts may be made without departing from the spirit of this invention.

I claim:

In a shipping case for eggs and the like, a container, a plurality of superimposed frames removably disposed within the container, said frames being arranged in coöperating pairs, each frame including two corresponding sections, a platform carried by each frame and having its edges clamped between the corresponding sections, the platforms of the coöperating frames having alining openings therein for receiving the opposite portions of the eggs or the like, and interlocking flanges formed upon the adjacent sections of the coöperating frames at the meeting edges thereof for interlocking engagement with each other whereby the said coöperating frames will be held against any lateral movement and thereby preventing the eggs or the like from breaking during shipment.

In testimony whereof I hereunto affix my signature in the presence of two witnesses.

BERTHOLD A. LANGE.

Witnesses:
GEORGE G. ANDERSON,
NANCY C. THOMAS.